United States Patent
Lau et al.

(10) Patent No.: US 10,164,730 B2
(45) Date of Patent: Dec. 25, 2018

(54) SIGNAL PROCESSING METHOD AND BASE STATION

(71) Applicant: Huawei Technologies Co., Ltd., Shenzhen (CN)

(72) Inventors: Kin Nang Lau, Hong Kong (CN); An Liu, Hong Kong (CN); Xiangming Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 15/248,777

(22) Filed: Aug. 26, 2016

(65) Prior Publication Data

US 2016/0365939 A1    Dec. 15, 2016

Related U.S. Application Data (63) Continuation of application No. PCT/CN2014/072571, filed on Feb. 26, 2014.

(51) Int. Cl.
   H04L 12/56    (2006.01)
   H04J 11/00    (2006.01)
   H04L 25/03    (2006.01)

(52) U.S. Cl.
   CPC ...... *H04J 11/004* (2013.01); *H04L 25/03006* (2013.01)

(58) Field of Classification Search
   None
   See application file for complete search history.

(56) References Cited

U.S. PATENT DOCUMENTS

| | | |
|---|---|---|
| 4,991,165 A | 2/1991 | Cronyn |
| 8,213,525 B2 | 7/2012 | Caire et al. |
| 2007/0110133 A1 | 5/2007 | Guess et al. |
| 2009/0097532 A1 | 4/2009 | Molev-Shteiman et al. |
| 2014/0016579 A1* | 1/2014 | Cheng ............... H04W 72/0453 370/329 |
| 2015/0078183 A1 | 3/2015 | Cao et al. |

FOREIGN PATENT DOCUMENTS

| | | |
|---|---|---|
| CN | 102970255 A | 3/2013 |
| CN | 103188190 A | 7/2013 |
| CN | 103197325 A | 7/2013 |
| CN | 103248461 A | 8/2013 |
| EP | 2442458 A1 | 4/2012 |

* cited by examiner

*Primary Examiner* — Zewdu A Beyen
(74) *Attorney, Agent, or Firm* — Leydig, Voit & Mayer, Ltd.

(57) ABSTRACT

Embodiments of the present invention provide a signal processing method and a base station. By using respective sparse characteristics of a user signal and an interference signal, the user signal and the interference signal are iteratively recovered, that is, the interference signal is first fastened, and the user signal is recovered; and then the user signal is fastened, and the interference signal is recovered. In this way, an iteration cycle is repeated until the recovered user signal and the recovered interference signal meet a preset condition, thereby effectively improving interference cancellation performance, achieving relatively good interference suppression.

10 Claims, 6 Drawing Sheets

SIGNAL PROCESSING METHOD AND BASE STATION

CROSS-REFERENCE TO RELATED APPLICATIONS

This application is a continuation of International Application No. PCT/CN2014/072571, filed on Feb. 26, 2014, which is hereby incorporated by reference in its entirety.

TECHNICAL FIELD

Embodiments of the present invention relate to the field of communications technologies, and in particular, to an information processing method and a base station.

BACKGROUND

Compressive sensing is an emerging signal processing technology in recent years, and a core idea of the compressive sensing is to simultaneously sample and compress data. A non-adaptive linear projection (a measurement value) of a signal is first collected, and then the signal is recovered by using the measurement value and according to a corresponding reconstruction algorithm. The compressive sensing has basic requirements in two aspects: sparseness of a signal and a non-correlation between an observation group (an observation matrix) and a transform group (a transform matrix). Any signal in nature has particular representation space, so that the signal has sparseness in this space.

A capacity of a wireless communications system is limited by interference. For example, in a mobile cellular system, there is not only intra-cell multiuser interference, but also inter-cell interference. Therefore, interference control and cancellation is a key technology for ensuring normal operation of a wireless network. An existing wireless interference control technology is mainly divided into three types as follows:

An interference avoidance technology: for example, Frequency Division Multiple Access (Frequency Division Multiple Access, FDMA for short), Time Division Multiple Access (Time Division Multiple Access, TDMA for short), and Orthogonal Frequency Division Multiple Access (Orthogonal Frequency Division Multiple Access, OFDMA for short), and these multiple access technologies are essentially to send, in mutually-orthogonal signal space, signals of different users in neighboring cells, thereby avoiding mutual interference between sent signals.

An interference averaging technology: in Code Division Multiple Access (Code Division Multiple Access, CDMA for short), signals sent by users are all extended by different pseudo-random codes to entire signal space, thereby implementing interference averaging and interference suppression.

A cooperative interference suppression technology: some new interference suppression technologies based on signal processing and wireless node cooperation have emerged recently. For example, interference alignment implements interference suppression by centralizing interference in same sub-space. A cooperative multiple-input multiple-output technology (Cooperative Multiple-Input Multiple-Output, Co-MIMO for short) is used to perform interference cancellation and improve a transmission rate by sharing channel state information and transmitting data between transmit ends that interfere with each other.

However, the foregoing wireless interference control technologies have respective disadvantages. For example, the interference avoidance technology cannot fully use signal latitude, and therefore has relatively low performance; the interference averaging technology has relatively poor performance when a signal-to-noise ratio is high; for the cooperative interference suppression technology, an advantage of the technology cannot be made used of because current wireless communications technologies have a lot of problems that are not resolved. Therefore, none of the foregoing technical solutions can implement optimal interference suppression.

SUMMARY

Embodiments of the present invention provide a signal processing method and a base station, to implement interference suppression, further improving interference cancellation performance, and a signal-to-noise ratio and a diversity gain that are of a receive end.

According to a first aspect, an embodiment of the present invention provides a signal processing method, including:

receiving, by a base station, a signal y, where the signal y includes a user signal $X_S$ and an interference signal $G_I$, where: $X_S$ is a vector including S user signals, and $X_S=[x_1\ x_2\ x_3\ \ldots\ x_s]$, where $x_1$ represents a first user signal, $x_2$ represents a second user signal, $x_3$ represents a third user signal, and so on, and $x_s$ represents an $s^{th}$ user signal; and $G_I$ is a vector including I interference signals, and $G_I=[g_1\ g_2\ g_3\ \ldots\ g_I]$, where $g_1$ represents a first interference signal, $g_2$ represents a second interference signal, $g_3$ represents a third interference signal, and so on, and $g_I$ represents an $I^{th}$ interference signal;

determining, by the base station, an initial value $G_I^0$ of the interference signal $G_I$, where $G_I^0=[g_1^0\ g_2^0\ g_3^0\ \ldots\ g_I^0]$;

determining, by the base station, a value $X_S^1$ of the user signal $X_S$ according to the initial value $G_I^0$ and the signal y, where $X_S^1=[x_1^1\ x_2^1\ x_3^1\ \ldots\ x_s^1]$;

determining, by the base station, that the value $X_S^1$ is an initial value $X_S^0$ of the user signal $X_S$, where $X_S^0=[x_1^1\ x_2^1\ x_3^1\ \ldots\ x_s^1]$;

determining, by the base station, a value $G_I^1$ of the interference signal $G_I$ according to the initial value $X_S^0$ and the signal y, where $G_I^1=[g_1^1\ g_2^1\ g_3^1\ \ldots\ g_I^1]$;

determining, by the base station, that the value $G_I^1$ is the initial value $G_I^0$ of the interference signal $G_I$, where $G_I^0=[g_1^1\ g_2^1\ g_3^1\ \ldots\ g_I^1]$;

performing, by using the foregoing method, iterative processing on the determined value $X_S^1$ of the user signal $X_S$ and the determined value $G_I^1$ of the interference signal $G_I$, until the value $X_S^1$ of the user signal $X_S$ and the value $G_I^1$ of the interference signal $G_I$ that are obtained through an $m^{th}$ iteration meet a preset condition, determining that an approximate value of the user signal $X_S$ is $X_S^1$, and determining that an approximate value of the interference signal $G_I$ is $G_I^1$.

In a first possible implementation manner of the first aspect, the determining, by the base station, an initial value $G_I^0$ of the interference signal $G_I$ includes:

solving, by the base station, a formula (1) to obtain Z, where Z includes an optimal solution $G_I^{opt}$ of the interference signal $G_I$:

$$\min_z \|\Phi Z - y\|_2, \quad (1)$$

s.t.

$$\|Z\|_0 = S + I$$

where $\| \ \|_2$ denotes the $l_2$-norm; $\| \ \|_0$ denotes the $l_0$-norm; $\Phi=[\Phi_S \ \Phi_I]$, and $$Z = \begin{bmatrix} X_S \\ G_I \end{bmatrix};$$

$\Phi_S=H$ or $\Phi_S=H_S f_S$, where $H_s$ is a frequency-domain response of a channel passed through by the user signal, and $f_s$ is a precoding vector used by user equipment UE; and $\Phi_I=E_I$ or $\Phi_I=H_I f_I$, where $E_I$ is a unit vector, $H_I$ is a frequency-domain response of a channel passed through by the interference signal, and $f_I$ is a precoding vector used by interference user equipment UE; and determining, by the base station, that the optimal solution $G_I^{opt}$ is the initial value $G_I^0$ of the interference signal $G_I$.

In a second possible implementation manner of the first aspect, the determining, by the base station, a value $X_S^1$ of the user signal $X_S$ according to the initial value $G_I^0$ and the signal y includes:

solving, by the base station, a formula (2) to obtain an optimal solution $Z_S$, and determining that $Z_S$ is the value $X_S^1$ of the user signal $X_S$:

$$\min_{z_S} \|\Phi_S Z_S - y_S\|_2, \quad (2)$$

s.t.

$$\|Z_S\|_0 = S$$

where $y_S = y - \Phi_I G_I^0$; and correspondingly, the determining, by the base station, a value $G_I^1$ of the interference signal $G_I$ according to the initial value $X_S^0$ and the signal y includes:

solving, by the base station, a formula (3) to obtain an optimal solution $Z_I$, and determining that $Z_I$ is the value $G_I^1$ of the interference signal $G_I$:

$$\min_{z_I} \|\Phi_I Z_I - y_I\|_2, \quad (3)$$

s.t.

$$\|Z_I\|_0 = I$$

where $y_I = y - \Phi_S X_S^0$.

With reference to the first or the second possible implementation manner of the first aspect, in a third possible implementation manner of the first aspect, the base station solves a formula by using a compressive sensing signal recovery algorithm to obtain an optimal solution.

With reference to the first aspect, the first possible implementation manner of the first aspect, the second possible implementation manner of the first aspect, or the third possible implementation manner of the first aspect, in a fourth possible implementation manner of the first aspect, the performing, by the base station by using the foregoing method, iterative processing on the determined value $X_S^1$ of the user signal $X_S$ and the determined value $G_I^1$ of the interference signal $G_I$, until the value $X_S^1$ of the user signal $X_S$ and the value $G_I^1$ of the interference signal $G_I$ that are obtained through an $m^{th}$ iteration meet a preset condition includes:

performing, by the base station by using the foregoing method, iterative processing on the determined value $X_S^1$ of the user signal $X_S$ and the determined value $G_I^1$ of the interference signal $G_I$, until a difference between an estimated error $\varepsilon^{m-1}$ obtained through calculation of a formula (4) by using the value $X_S^1$ of the user signal $X_S$ and the value $G_I^1$ of the interference signal $G_I$ that are obtained through an $(m-1)^{th}$ iteration and an estimated error $\varepsilon^m$ obtained through calculation of the formula (4) by using the value $X_S^1$ of the user signal $X_S$ and the value $G_I^1$ of the interference signal $G_I$ that are obtained through the $m^{th}$ iteration is greater than a preset threshold $\varepsilon$:

$$\varepsilon^i = \|\Phi_S X_S^1 + \Phi_I G_I^1 - y\|_2 \quad (4)$$

where i is a natural number, and $\varepsilon^i$ represents an estimated error obtained through an $i^{th}$ iteration;

or collecting, by the base station, statistics on a quantity of iteration times, until the quantity of iteration times is greater than a preset threshold m.

According to a second aspect, an embodiment of the present invention provides a base station, including:

a receiving module, configured to receive a signal y, where the signal y includes a user signal $X_S$ and an interference signal $G_I$, where: $X_S$ is a vector including S user signals, and $X_S=[x_1 \ x_2 \ x_3 \ \ldots \ x_s]$, where $x_1$ represents a first user signal, $x_2$ represents a second user signal, $x_3$ represents a third user signal, and so on, and $x_s$ represents an $s^{th}$ user signal; and $G_I$ is a vector including I interference signals, and $G_I=[g_1 \ g_2 \ g_3 \ \ldots \ g_I]$, where $g_1$ represents a first interference signal, $g_2$ represents a second interference signal, $g_3$ represents a third interference signal, and so on, and $g_I$ represents an $I^{th}$ interference signal; and a determining module, configured to determine an initial value $G_I^0$ of the interference signal $G_I$, where $G_I^0=[g_1^0 \ g_2^0 \ g_3^0 \ \ldots \ g_I^0]$; determine a value $X_S^1$ of the user signal $X_S$ according to the initial value $G_I^0$ and the signal y, where $X_S^1=[x_1^1 \ x_2^1 \ x_3^1 \ \ldots \ x_s^1]$; determine that the value $X_S^1$ is an initial value $X_S^0$ of the user signal $X_S$, where $X_S^0=[x_1^1 \ x_2^1 \ x_3^1 \ \ldots \ x_s^1]$; determine a value $G_I^1$ of the interference signal $G_I$ according to the initial value $X_S^0$ and the signal y, where $G_I^1=[g_1^1 \ g_2^1 \ g_3^1 \ \ldots \ g_I^1]$; determine that the value $G_I^1$ is the initial value $G_I^0$ of the interference signal $G_I$, where $G_I^0=[g_I^1 \ g_I^2 \ g_I^3 \ \ldots \ g_I^1]$; and perform iterative processing on the value $X_S^1$ of the user signal $X_S$ and the value $G_I^1$ of the interference signal $G_I$, until the value $X_S^1$ of the user signal $X_S$ and the value $G_I^1$ of the interference signal $G_I$ that are obtained through an $m^{th}$ iteration meet a preset condition, determine that an approximate value of the user signal $X_S$ is $X_S^1$, and determine that an approximate value of the interference signal $G_I$ is $G_I^1$.

In a first possible implementation manner of the second aspect, the determining module is specifically configured to:

solve a formula (1) to obtain Z, where Z includes an optimal solution $G_I^{opt}$ of the interference signal $G_I$:

$$\min_z \|\Phi Z - y\|_2, \quad (1)$$

s.t.

$$\|Z\|_0 = S + I$$

where $\| \ \|_2$ denotes the $l_2$-norm; $\| \ \|_0$ denotes the $l_0$-norm; $\Phi=[\Phi_S \ \Phi_I]$, and $$Z = \begin{bmatrix} X_S \\ G_I \end{bmatrix};$$

$\Phi_S$=H or $\Phi_S$=$H_S f_S$, where $H_s$ is a frequency-domain response of a channel passed through by the user signal, and $f_s$ is a precoding vector used by user equipment UE; and $\Phi_I$=$E_I$ or $\Phi_I$=$H_I f_I$, where $E_I$ is a unit vector, $H_I$ is a frequency-domain response of a channel passed through by the interference signal, and $f_I$ is a precoding vector used by interference user equipment UE; and determine that the optimal solution $G_I^{opt}$ is the initial value $G_I^0$ of the interference signal $G_I$.

In a second possible implementation manner of the second aspect, the determining module is specifically configured to:

solve a formula (2) to obtain an optimal solution $Z_S$, and determine that $Z_S$ is the value $X_S^1$ of the user signal $X_S$:

$$\min_{z_S} \|\Phi_S Z_S - y_S\|_2, \quad (2)$$
$$\text{s.t.}$$
$$\|Z_S\|_0 = S$$

where $y_S$=$y$−$\Phi_I G_I^0$; and solve a formula (3) to obtain an optimal solution $Z_I$, and determine that $Z_I$ is the value $G_I^1$ of the interference signal $G_I$:

$$\min_{z_I} \|\Phi_I Z_I - y_I\|_2, \quad (3)$$
$$\text{s.t.}$$
$$\|Z_I\|_0 = I$$

where $y_I$=$y$−$\Phi_S X_S^0$.

With reference to the first or the second possible implementation manner of the second aspect, in a third possible implementation manner of the second aspect, the base station further includes a compressive sensing module, configured to solve, by using a compressive sensing signal recovery algorithm, a formula to obtain an optimal solution.

With reference to the second aspect, the first possible implementation manner of the second aspect, the second possible implementation manner of the second aspect, or the third possible implementation manner of the second aspect, in a fourth possible implementation manner of the second aspect, the determining module is specifically configured to:

perform iterative processing on the value $X_S^1$ of the user signal $X_S$ and the value $G_I^1$ of the interference signal $G_I$, until a difference between an estimated error $\varepsilon^{m-1}$ obtained through calculation of a formula (4) by using the value $X_S^1$ of the user signal $X_S$ and the value $G_I^1$ of the interference signal $G_I$ that are obtained through an (m−1)$^{th}$ iteration and an estimated error $\varepsilon^m$ obtained through calculation of the formula (4) by using the value $X_S^1$ of the user signal $X_S$ and the value $G_I^1$ of the interference signal $G_I$ that are obtained through the m$^{th}$ iteration is greater than a preset threshold $\varepsilon$:

$$\varepsilon^i = \|\Phi_S X_S^1 + \Phi_I G_I^1 - y\|_2 \quad (4)$$

where i is a natural number, and $\varepsilon^i$ represents an estimated error obtained through an i$^{th}$ iteration; or collect statistics on a quantity of iteration times, until the quantity of iteration times is greater than a preset threshold m.

According to the signal processing method and the base station provided in the embodiments of the present invention, by using respective sparse characteristics of a user signal and an interference signal, the user signal and the interference signal are iteratively recovered by using a compressive sensing signal recovery algorithm, that is, the interference signal is first fastened, and the user signal is recovered by using the compressive sensing signal recovery algorithm; and then the user signal is fastened, and the interference signal is recovered by using the compressive sensing signal recovery algorithm. In this way, an iteration cycle is repeated until the recovered user signal and the recovered interference signal meet a preset condition, thereby effectively improving interference cancellation performance, achieving relatively good interference suppression.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Embodiment 1

Figure 1:
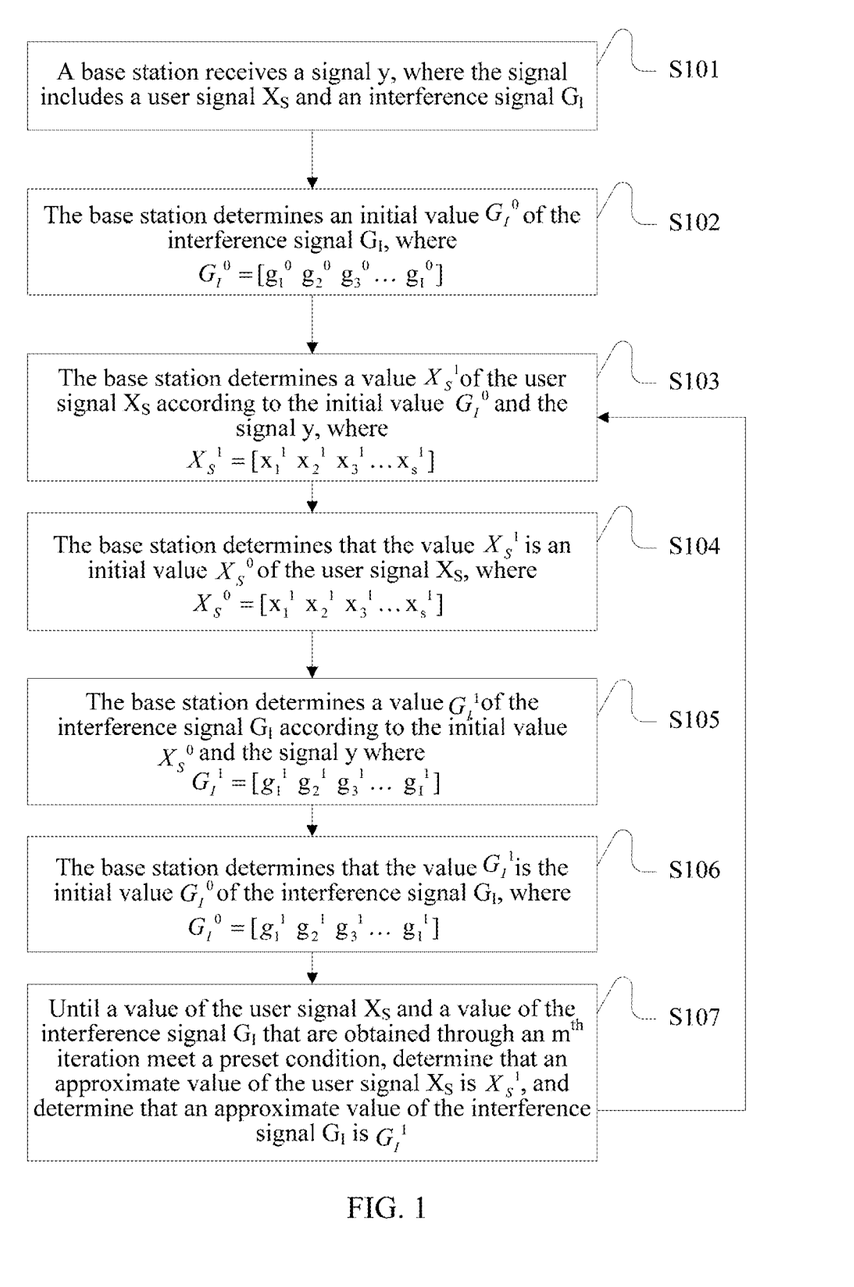
FIG. 1 is a schematic flowchart of Embodiment 1 of a signal processing method according to the present invention.

FIG. 1 is a schematic flowchart of Embodiment 1 of a signal processing method according to the present invention, and the signal processing method specifically includes the following steps:

S101: A base station receives a signal y, where the signal y includes a user signal $X_S$ and an interference signal $G_I$, where: $X_S$ is a vector including S user signals, and $X_S$=$[x_1$ $x_2 \ x_3 \ \ldots \ x_s$], where $x_1$ represents a first user signal, $x_2$ represents a second user signal, $x_3$ represents a third user signal, and so on, and $x_s$ represents an $s^{th}$ user signal; and $G_I$ is a vector including I interference signals, and $G_I=[g_1 \ g_2 \ g_3 \ \ldots \ g_I]$, where $g_1$ represents a first interference signal, $g_2$ represents a second interference signal, $g_3$ represents a third interference signal, and so on, and $g_I$ represents an $I^{th}$ interference signal.

S102: The base station determines an initial value $G_I^0$ of the interference signal $G_I$, where $G_I^0=[g_1^0 \ g_2^0 \ g_3^0 \ \ldots \ g_I^0]$.

Specifically, the base station may determine the initial value $G_I^0$ of the interference signal $G_I$ by using the following method:

solving, by the base station, a formula (1) to obtain Z, where Z includes an optimal solution $G_I^{opt}$ of the interference signal $G_I$:

$$\min_{z} \|\Phi Z - y\|_2, \quad (1)$$
$$\text{s.t.}$$
$$\|Z\|_0 = S + I$$

where $\| \ \|_2$ denotes the $l_2$-norm; $\| \ \|_0$ denotes the $l_0$-norm; $\Phi=[\Phi_S \ \Phi_I]$, and $$Z = \begin{bmatrix} X_S \\ G_I \end{bmatrix};$$

$\Phi_S=H$ or $\Phi_S=H_S f_S$, where $H_s$ is a frequency-domain response of a channel passed through by the user signal, and $f_s$ is a precoding vector used by user equipment UE; and $\Phi_I=E_I$ or $\Phi_I=H_I f_I$, where $E_I$ is a unit vector, $H_I$ is a frequency-domain response of a channel passed through by the interference signal, and $f_I$ is a precoding vector used by interference user equipment UE; and determining that the optimal solution $G_I^{opt}$ is the initial value $G_I^0$ of the interference signal $G_I$.

For example, the base station may solve, by using a compressive sensing signal recovery algorithm, the foregoing formula (1) to obtain the optimal solution, for example, a BP algorithm, an MP algorithm, an OMP algorithm, an ROMP algorithm, a CoSaMP algorithm, and an SP algorithm.

S103: The base station determines a value $X_S^1$ of the user signal $X_S$ according to the initial value $G_I^0$ and the signal y, where $X_S^1=[x_1^1 \ x_2^1 \ x_3^1 \ \ldots \ x_s^1]$.

Specifically, the base station solves a formula (2) to obtain an optimal solution $Z_S$, and determines that $Z_S$ is the value $X_S^1$ of the user signal $X_S$:

$$\min_{z_S} \|\Phi_S Z_S - y_S\|_2, \quad (2)$$
$$\text{s.t.}$$
$$\|Z_S\|_0 = S$$

where $y_S = y - \Phi_I G_I^0$.

For example, the base station may solve, by using the compressive sensing signal recovery algorithm, the foregoing formula (2) to obtain the optimal solution, for example, a BP algorithm, an MP algorithm, an OMP algorithm, an ROMP algorithm, a CoSaMP algorithm, and an SP algorithm.

S104: The base station determines that the value $X_S^1$ is an initial value $X_S^0$ of the user signal $X_S$, where $X_S^0=[x_1^1 \ x_2^1 \ x_3^1 \ \ldots \ x_s^1]$.

S105: The base station determines a value $G_I^1$ of the interference signal $G_I$ according to the initial value $X_S^0$ and the signal y, where $G_I^1=[g_1^1 \ g_2^1 \ g_3^1 \ \ldots \ g_I^1]$.

Specifically, the base station solves a formula (3) to obtain an optimal solution $Z_I$, and determines that $Z_I$ is the value $G_I^1$ of the interference signal $G_I$:

$$\min_{z_I} \|\Phi_I Z_I - y_I\|_2, \quad (3)$$
$$\text{s.t.}$$
$$\|Z_I\|_0 = I$$

where $y_I = y - \Phi_S X_S^0$.

For example, the base station may solve, by using the compressive sensing signal recovery algorithm, the foregoing formula (2) to obtain the optimal solution, for example, a BP algorithm, an MP algorithm, an OMP algorithm, an ROMP algorithm, a CoSaMP algorithm, and an SP algorithm.

S106: The base station determines that the value $G_I^1$ is the initial value $G_I^0$ of the interference signal $G_I$, where $G_I^0=[g_1^1 \ g_2^1 \ g_3^1 \ \ldots \ g_I^1]$.

S107: Repeat steps S103 to S106, until the value $X_S^1$ of the user signal $X_S$ and the value $G_I^1$ of the interference signal $G_I$ that are obtained through an $m^{th}$ iteration meet a preset condition, determine that an approximate value of the user signal $X_S$ is $X_S^1$, and determine that an approximate value of the interference signal $G_I$ is $G_I^1$.

Specifically, the base station performs, by using the foregoing method, iterative processing on the determined value $X_S^1$ of the user signal $X_S$ and the determined value $G_I^1$ of the interference signal $G_I$, until a difference between an estimated error $\varepsilon^{m-1}$ obtained through calculation of a formula (4) by using the value $X_S^1$ of the user signal $X_S$ and the value $G_I^1$ of the interference signal $G_I$ that are obtained through an $(m-1)^{th}$ iteration and an estimated error $\varepsilon^m$ obtained through calculation of the formula (4) by using the value $X_S^1$ of the user signal $X_S$ and the value $G_I^1$ of the interference signal $G_I$ that are obtained through the $m^{th}$ iteration is greater than a preset threshold $\varepsilon$:

$$\varepsilon^i = \|\Phi_S X_S^1 + \Phi_I G_I^1 - y\|_2 \quad (4)$$

where i is a natural number, and $\varepsilon^i$ represents an estimated error obtained through an $i^{th}$ iteration; or the base station collects statistics on a quantity of iteration times, until the quantity of iteration times is greater than a preset threshold m.

According to the signal processing method provided in this embodiment, by using respective sparse characteristics of a user signal and an interference signal, the user signal and the interference signal are iteratively recovered, that is, the interference signal is first fastened, and the user signal is recovered; and then the user signal is fastened, and the interference signal is recovered. In this way, an iteration cycle is repeated until the recovered user signal and the recovered interference signal meet a preset condition, thereby effectively improving interference cancellation performance, achieving relatively good interference suppression.

A specific embodiment is used to describe the present invention in detail with reference to a specific application scenario below.

First, the application scenario in this embodiment of the present invention and a process of pre-processing a user signal or an interference signal before the base station receives the signal y are described.

Application Scenario 1

Figure 2:
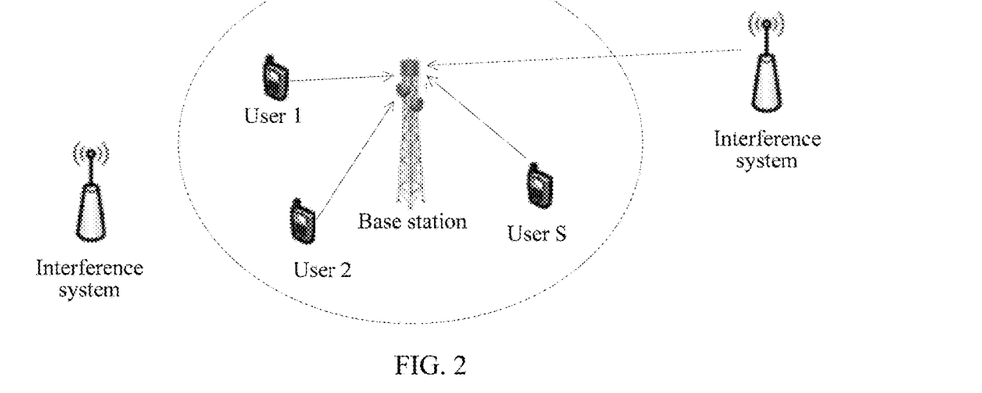
FIG. 2 is a schematic diagram of an application scenario 1 according to the present invention.

FIG. 2 is a schematic diagram of an application scenario 1 according to the present invention, and an uplink of a cell in a cellular network is considered. It is assumed that K user equipments in the cell communicate with a base station using an OFDM modulation scheme, and a quantity of available subcarriers in a system is N. When user equipment communicates with the base station, the user equipment generally suffers from interference from another system, and for ease of descriptions herein, the another system is referred to as an interference system. Therefore, signals received on a base station side not only include a user signal sent by the user equipment, but also include an interference signal from the another system.

For example, in any timeslot, there are S user equipments that send user signals $X_S$ to the base station, and the base station also receives I interference signals $G_I$ from the interference system, so that a signal y received by the base station may be represented as:

$$y = \sum_{k=1}^{K} H_k X_S(k) + \sum_{i=1}^{I} G_I(i)$$

where $H_k$ is a frequency-domain response of a channel passed through by a signal sent by $k^{th}$ user equipment, $X_S(k)$ is a user signal sent by the $k^{th}$ user equipment, and $G_I(i)$ is an $i^{th}$ interference signal.

Further, let $\Phi_S=[H_1 \ H_2 \ldots H_K]$, and $\Phi_I=E_I$, where $E_I$ is a unit vector, $$X_S = \begin{bmatrix} X_S(1) \\ X_S(2) \\ \ldots \\ X_S(K) \end{bmatrix},$$

and $$G_I = \begin{bmatrix} G_I(1) \\ G_I(2) \\ \ldots \\ G_I(I) \end{bmatrix},$$

so that a formula is obtained:

$$y=\Phi_S X_S+\Phi_I G_I \qquad (5)$$

Figure 3:
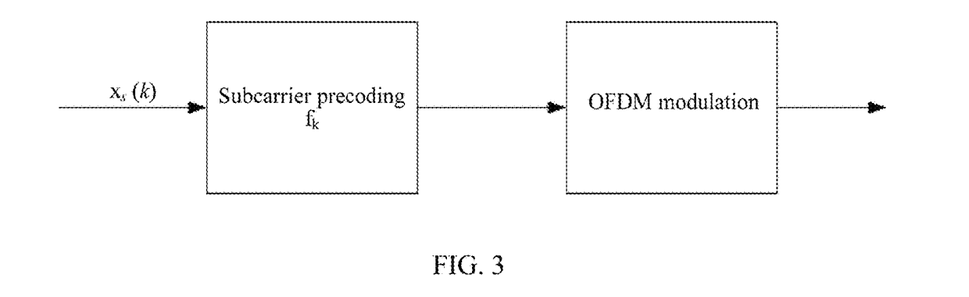
FIG. 3 is a schematic diagram of precoding processing in the application scenario 1 according to the present invention.

In addition, to fully use a frequency-domain diversity gain and improve performance of interference cancellation and signal recovery, on a user side, a user signal sent by each user equipment is sent after being multiplied by a precoding vector. FIG. 3 is a schematic diagram of precoding processing in the application scenario 1 according to the present invention. Assuming that a precoding vector of a $k^{th}$ user is $f_k$, the signal y received by the base station may be represented as:

$$y = \sum_{k=1}^{K} H_k f_k X_S(k) + \sum_{i=1}^{I} G_I(i).$$

Further, let $\Phi_S=[H_1 f_1 \ H_2 f_2 \ldots H_K f_K]$, and $\Phi_I=I_I$, where $I_I$ is a unit vector, $$X_S = \begin{bmatrix} X_S(1) \\ X_S(2) \\ \ldots \\ X_S(K) \end{bmatrix},$$

and $$G_I = \begin{bmatrix} G_I(1) \\ G_I(2) \\ \ldots \\ G_I(I) \end{bmatrix},$$

so that a formula is obtained:

$$y=\Phi_S X_S+\Phi_I G_I \qquad (5).$$

It should be noted that, a precoding vector of a subcarrier of each user meets $\|f_k\|=1$, and may be randomly generated. For example, a unitary matrix is first randomly generated, and then K columns in the unitary matrix are selected as precoding vectors of K users.

Application Scenario 2

Figure 4:
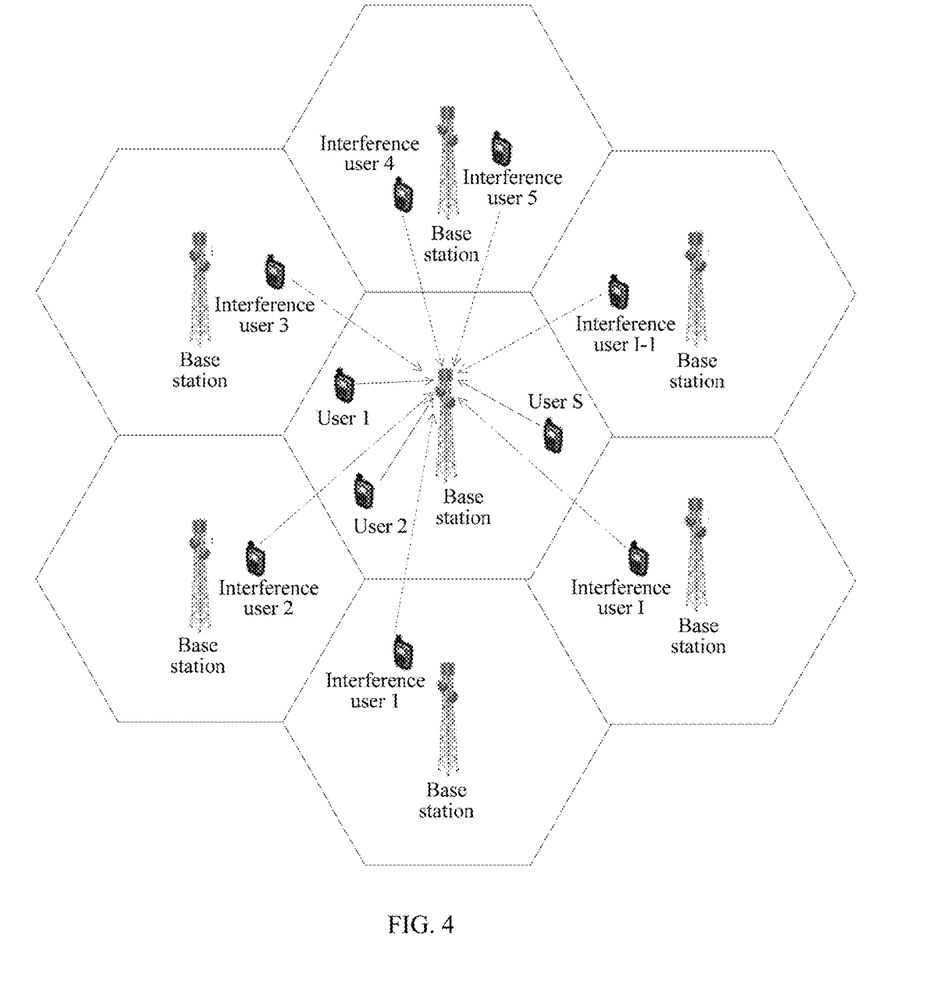
FIG. 4 is a schematic diagram of an application scenario 2 according to the present invention.

FIG. 4 is a schematic diagram of an application scenario 2 according to the present invention, and an uplink in a cellular network is considered. There are multiple cells in a system, where multiple user equipments in each cell communicate with a base station using an OFDM modulation scheme, and a quantity of available subcarriers in the system is N. In a process in which user equipment in each cell communicates with the base station, the user equipment suffers from interference from user equipment of a neighboring cell, and for ease of descriptions herein, the user equipment of the neighboring cell is referred to as interference user equipment. Therefore, signals received on a base station side not only include a user signal sent by the user equipment, but also include an interference signal sent by the interference user equipment.

It should be noted that, in the following descriptions, only interference cancellation and user signal recovery of a reference base station, for example, a base station 0 in FIG. 3, are considered.

For example, in any timeslot, there are S user equipments that send user signals $X_S$ to a base station, and the base station also receives interference signals $G_I$ sent from I interference user equipments of a neighboring cell, so that the signal y received by the base station may be represented as:

$$y = \sum_{k=1}^{K} H_k X_S(k) + \sum_{i=1}^{I} \overline{H}_i \overline{G}_I(l)$$

where $H_k$ is a frequency-domain response of a channel passed through by a signal sent by $k^{th}$ user equipment, $X_S(k)$ is the signal sent by the $k^{th}$ user equipment, $\overline{H}_i$ is a frequency-domain response of a channel passed through by an interference signal from $i^{th}$ user equipment, and $\overline{G}_I(i)$ is the interference signal from the $i^{th}$ user equipment.

Further, let $\Phi_S = [H_1 \ H_2 \ \ldots \ H_K]$, $\Phi_I = [\overline{H}_1 \ \overline{H}_2 \ \ldots \ \overline{H}_I]$, $$X_S = \begin{bmatrix} X_S(1) \\ X_S(2) \\ \ldots \\ X_S(K) \end{bmatrix},$$

and $$G_I = \begin{bmatrix} \overline{G}_I(1) \\ \overline{G}_I(2) \\ \ldots \\ \overline{G}_I(K) \end{bmatrix},$$

so that a formula is obtained:

$$y = \Phi_S X_S + \Phi_I G_I \quad (5).$$

In addition, similar to the application scenario 1, to fully use a frequency-domain diversity gain and improve performance of interference cancellation and signal recovery, on a user side, a user signal sent by each user equipment is sent after being multiplied by a precoding vector. Assuming that a precoding vector of a $k^{th}$ user is $f_k$, the signal y received by the base station may be represented as:

$$y = \sum_{k=1}^{K} H_k f_k X_S(k) + \sum_{i=1}^{I} \overline{H}_i \overline{f}_i \overline{G}_I(i).$$

Further, let $\Phi_S = [H_1 f_1 \ H_2 f_2 \ \ldots \ H_K f_K]$, $\Phi_I = [\overline{H}_1 \overline{f}_1 \ \overline{H}_2 \overline{f}_2 \ \ldots \ \overline{H}_I \overline{f}_I]$, $$X_S = \begin{bmatrix} X_S(1) \\ X_S(2) \\ \ldots \\ X_S(K) \end{bmatrix},$$

and $$G_I = \begin{bmatrix} \overline{G}_I(1) \\ \overline{G}_I(2) \\ \ldots \\ \overline{G}_I(K) \end{bmatrix},$$

so that a formula is obtained:

$$y = \Phi_S X_S + \Phi_I G_I \quad (5).$$

According to the foregoing formula (1), after the base station receives the signal y, recovery of the user signal $X_S$ and cancellation of the interference signal $X_I$ may be transformed, according to a compressive sensing theory, into calculating approximate solutions of the user signal $X_S$ and the interference signal $G_I$.

It should be noted that, both Embodiment 2 and Embodiment 3 described below are applicable to the foregoing application scenarios.

Embodiment 2

Figure 5:
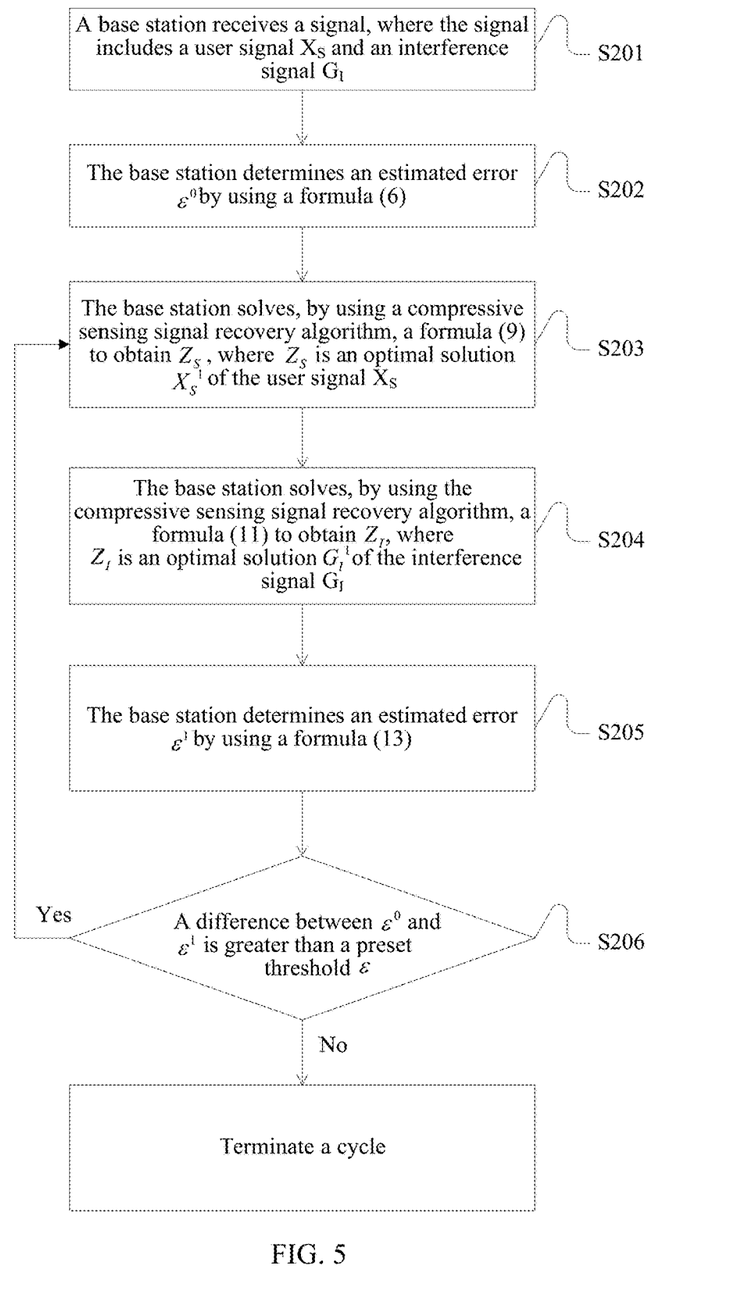
FIG. 5 is a schematic flowchart of Embodiment 2 of a signal processing method according to the present invention.

FIG. 5 is a schematic flowchart of Embodiment 2 of a signal processing method according to the present invention, and the signal processing method specifically includes the following steps:

S201: A base station receives a signal y, where the signal y includes a user signal $X_S$ and an interference signal $G_I$.

S202: The base station determines an estimated error $\varepsilon^0$ by using a formula (6):

$$\varepsilon^0 = \|\Phi_S X_S^0 + \Phi_I G_I^0 - y\|_2 \quad (6)$$

where $\| \ \|_2$ denotes the $l_2$-norm; $\Phi_S = H$ or $\Phi_S = H_s f_s$, where $H_s$ is a frequency-domain response of a channel passed through by the user signal, and $f_s$ is a precoding vector used by user equipment UE; $\Phi_I = E_I$ or $\Phi_I = H_I f_I$, where $E_I$ is a unit vector, $H_I$ is a frequency-domain response of a channel passed through by the interference signal, and $f_I$ is a precoding vector used by interference user equipment UE; $X_S^0$ is an initial value of the user signal $X_S$; and $G_I^0$ is an initial value of the interference signal $G_I$.

Specifically, the base station may preset the initial value $X_S^0$ of the user signal $X_S$ and the initial value $G_I^0$ of the interference signal $G_I$, or may obtain through calculation by using the following method: according to the formula (5), further let $\Phi = [\Phi_S \ \Phi_I]$, and $$Z = \begin{bmatrix} X_S \\ G_I \end{bmatrix},$$

and the signal y received by the base station may be further represented as:

$$y = \Phi Z \quad (7).$$

The base station transforms, by using a compressive sensing theory, a process of solving the formula (7) into solving the following formula (8) to obtain an optimal solution:

$$\min_Z \|\Phi Z - y\|_2, \quad (8)$$

s.t.

$$\|Z\|_0 = S + I$$

where S+I is a quantity of nonzero elements of a vector Z, the base station may solve, by using an existing compressive sensing algorithm, for example, a BP algorithm, an MP algorithm, an OMP algorithm, an ROMP algorithm, a CoSaMP algorithm, and an SP algorithm, the formula (8) to obtain Z. It may be known from $$Z = \begin{bmatrix} X_S \\ G_I \end{bmatrix}$$

that, Z includes an optimal solution of the user signal $X_S$ and an optimal solution of the interference signal $G_I$, and the optimal solution $X_S^0$ of the user signal $X_S$ and the optimal solution $G_I^0$ of the interference signal $G_I$ may be obtained by separating the optimal solution of Z, so that it may be determined that $X_S^0$ is the initial value of the user signal $X_S$, and it may be determined that $G_I^0$ is the initial value of the interference signal $G_I$. After the initial value of the user signal $X_S$ and the initial value of the interference signal $G_I$ are determined, the formula (6) is used to calculate an initial estimated error $\varepsilon^0$.

S203: The base station solves, by using a compressive sensing signal recovery algorithm, a formula (9) to obtain $Z_S$, where $Z_S$ is an optimal solution $X_S^1$ of the user signal $X_S$:

$$\min_{Z_S} \|\Phi_S Z_S - y_S\|_2, \qquad (9)$$
$$\text{s.t.}$$
$$\|Z_S\|_0 = S$$

where min∥ ∥denotes a minimum value; ∥ ∥$_0$ denotes the $l_0$-norm; $y_S = y - \Phi_I G_I^0$; and S is a quantity of nonzero elements included in the user signal.

Specifically, after the initial value $X_S^0$ of the user signal $X_S$ and the initial value $G_I^0$ of the interference signal $G_I$ are determined, the initial value $G_I^0$ of the interference signal $G_I$ is set to a fixed known value, to continue to calculate the optimal solution of the user signal $X_S$. The initial value $G_I^0$ of the interference signal $G_I$ is substituted into the foregoing formula (5), so as to obtain $y = \Phi_S X_S + \Phi_I G_I^0$, and further obtain $\Phi_S X_S = y - \Phi_I G_I^0$, let $y_S = y - \Phi_I G_I^0$, and a formula (10) may be obtained:

$$y_S = \Phi_S X_S \qquad (10).$$

The compressive sensing theory is used to transform a process of solving the formula (10) into solving the foregoing formula (9) to obtain an optimal solution, and the base station solves, by using the existing compressive sensing signal recovery algorithm, the formula (9) to obtain $Z_S$, where $Z_S$ is an optimal solution $X_S^1$ of the user signal $X_S$. It should be noted that, a same compressive sensing signal recovery algorithm is used in steps of this embodiment to solve the formula (9) to obtain $Z_S$, where $Z_S$ is the optimal solution $X_S^1$ of the user signal $X_S$.

S204: The base station solves, by using the compressive sensing signal recovery algorithm, a formula (11) to obtain $Z_I$, where $Z_I$ is an optimal solution $G_I^1$ of the interference signal $G_I$:

$$\min_{Z_I} \|\Phi_I Z_I - y_I\|_2, \qquad (11)$$
$$\text{s.t.}$$
$$\|Z_I\|_0 = I$$

where $y_I = y - \Phi_S X_S^1$; and I is a quantity of nonzero elements included in the interference signal.

Specifically, similar to step S203, after the optimal solution $X_S^1$ of the user signal $X_S$ is determined, the optimal solution $X_S^1$ of the user signal $X_S$ is set to a fixed known value, to continue to calculate the optimal solution of the interference signal $G_I$. The optimal solution $X_S^1$ of the user signal $X_S$ is substituted into the foregoing formula (1), so as to obtain $y + \Phi_S X_S^1 + \Phi_I G_I$, and further obtain $\Phi_I G_I = y - \Phi_S X_S^1$, let $y - \Phi_S X_S^1$, and a formula (12) may be obtained:

$$y_I = \Phi_I G_I \qquad (12).$$

The compressive sensing theory is used to transform a process of solving the formula (12) into solving the foregoing formula (11) to obtain an optimal solution, and the base station solves, by using the existing compressive sensing signal recovery algorithm, the formula (12) to obtain $Z_I$, where $Z_I$ is the optimal solution $G_I^1$ of the user signal $G_I$.

S205: The base station determines an estimated error $\varepsilon^1$ by using a formula (13) to:

$$\varepsilon^1 = \|\Phi_S X_S^1 + \Phi_I G_I^1 - y\|_2 \qquad (13).$$

S206: If a difference between $\varepsilon^0$ and $\varepsilon^1$ is greater than a preset threshold $\varepsilon$, the base station continues to repeat steps S203 and S204, and solves, by using the compressive sensing signal recovery algorithm, the formula (9) to obtain $Z_S$, where $Z_S$ is an optimal solution $X_S^2$ of the user signal $X_S$, where $y_S = y - \Phi_I G_I^1$; the base station solves, by using the compressive sensing signal recovery algorithm, the formula (11) to obtain $Z_I$, where $Z_I$ is an optimal solution $G_I^2$ of the interference signal $G_I$, where $y_I = y - \Phi_S X_S^2$; and the base station determines an estimated error $\varepsilon^2$ by using the formula (10):

$$\varepsilon^2 = \|\Phi_S X_S^2 + \Phi_I G_I^2 - y\|_2 \qquad (14).$$

If a difference between $\varepsilon^2$ and $\varepsilon^1$ is greater than the preset threshold $\varepsilon$, an iteration process in steps S203 and S204 is repeated, until a difference between $\varepsilon^{m-1}$ and $\varepsilon^m$ that are obtained by using an optimal solution $X_S^m$ of a sent signal $X_S$ and an optimal solution $G_I^m$ of the interference signal $G_I$ that are obtained through an $m^{th}$ calculation is less than or equal to the preset threshold $\varepsilon$, where $X_S^m$ is an estimated value of the user signal $X_S$, and $G_I^m$ is an estimated value of the interference signal $G_I$.

In this embodiment, by using respective sparse characteristics of a user signal and an interference signal, the user signal and the interference signal are iteratively recovered by using a compressive sensing signal recovery algorithm, that is, the interference signal is first fastened, and the user signal is recovered by using the compressive sensing signal recovery algorithm; and then the user signal is fastened, and the interference signal is recovered by using the compressive sensing signal recovery algorithm. In this way, an iteration cycle is repeated until the recovered user signal and the recovered interference signal meet a preset error, thereby effectively improving interference cancellation performance, achieving relatively good interference suppression.

In addition, a joint interference signal cancellation and compressive sensing signal recovery algorithm based on sparseness maximum likelihood estimation is used in this embodiment. In a case without knowing a user signal and an interference signal, remaining signal latitude that is not occupied by the user signal and the interference signal can be fully used, to improve interference signal cancellation performance, and a signal-to-noise ratio and a diversity gain that are of a receive end. Because joint interference signal cancellation and user signal recovery is used, and the respective sparse characteristics of the user signal and the interference signal are used, interference cancellation performance in this embodiment is greatly better than that in an existing interference cancellation method, and none of the following limitation conditions is needed in this embodiment: 1. a system has extra latitude; 2. interference is a sparse frequency domain; 3. support of interference and support of a wanted signal are not overlapped; or 4. the support of the interference is known. Therefore, an application scope of this embodiment is wider.

Embodiment 3

Figure 6:
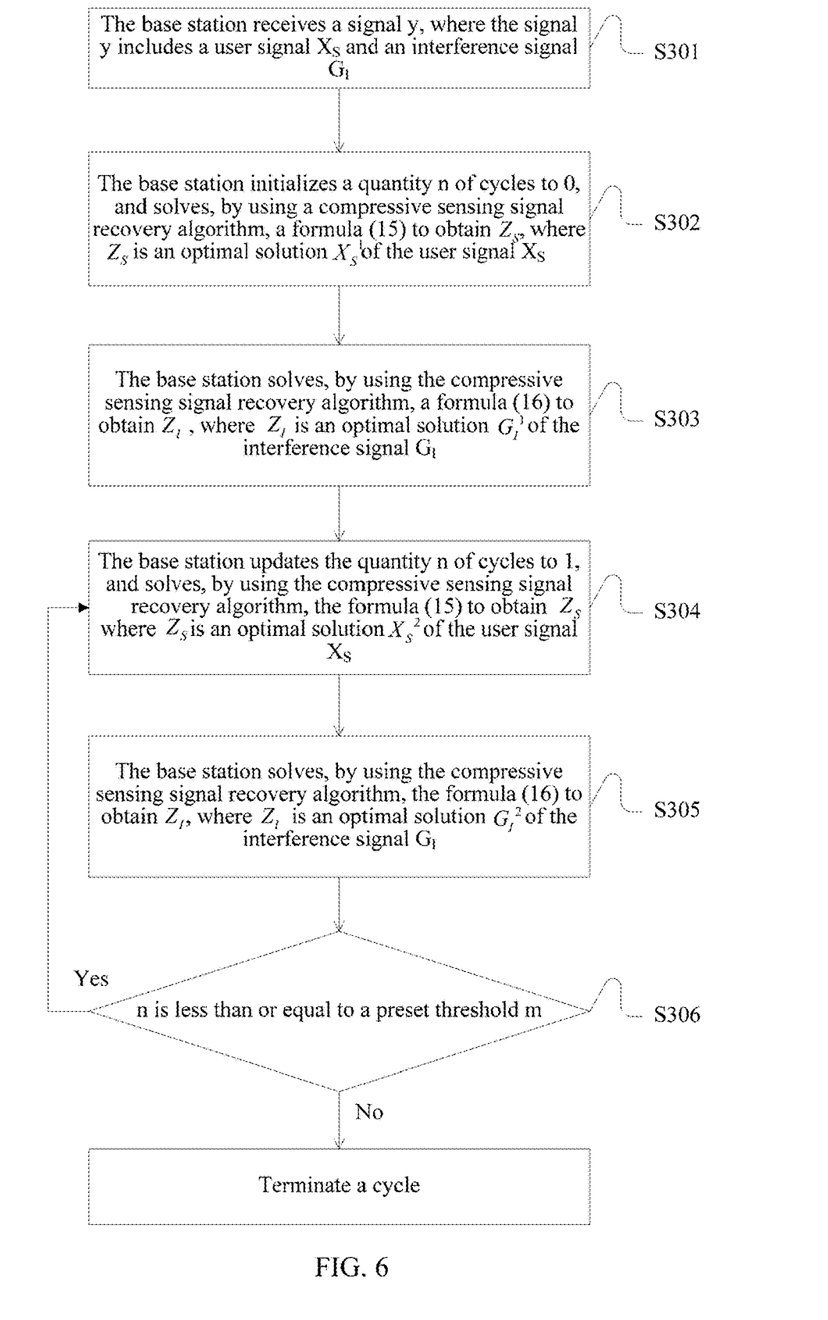
FIG. 6 is a schematic flowchart of Embodiment 3 of a signal processing method according to the present invention.

FIG. 6 is a schematic flowchart of Embodiment 3 of a signal processing method according to the present invention, and a difference between this embodiment and Embodiment 2 is that in this embodiment, a quantity of iteration times for calculating a user signal and an interference signal is controlled by using a quantity of cycles. The method specifically includes the following steps:

S301: A base station receives a signal y, where the signal y includes a user signal $X_S$ and an interference signal $G_I$.

S302: The base station initializes a quantity n of cycles to 0, and solves, by using a compressive sensing signal recovery algorithm, a formula (15) to obtain $Z_S$, where $Z_S$ is an optimal solution $X_S^1$ of the user signal $X_S$:

$$\min_{z_S} \|\Phi_S Z_S - y_S\|_2, \quad (15)$$
$$\text{s.t.}$$
$$\|Z_S\|_0 = S$$

where $\min\| \ \|$ denotes a minimum value; $\| \ \|_0$ denotes the $l_0$-norm; $\| \ \|_2$ denotes the $l_2$-norm; $\Phi_S=H$ or $\Phi_S=H_S f_S$, where $H_S$ is a frequency-domain response of a channel passed through by the user signal, and $f_S$ is a precoding vector used by user equipment UE; $y_S=y-\Phi_I G_I^0$; S is a quantity of nonzero elements included in the user signal; and $G_I^0$ is an initial value of the interference signal $G_I$.

Specifically, similar to step S202 in Embodiment 1, the base station may preset an initial value $G_I^0$ of the interference signal $G_I$, or may obtain through calculation by using the following method: according to the formula (5), further let $\Phi=[\Phi_S \ \Phi_I]$, and $$Z = \begin{bmatrix} X_S \\ G_I \end{bmatrix},$$

and the signal y received by the base station may be further represented as:

$$y=\Phi Z \quad (7).$$

The base station transforms, by using a compressive sensing theory, a process of solving the formula (7) into solving the following formula (8) to obtain an optimal solution:

$$\min_{z} \|\Phi Z - y\|_2, \ \text{s.t.} \|Z\|_0 = S + I \quad (8)$$

where S+I is a quantity of nonzero elements of a vector Z, the base station may solve, by using an existing compressive sensing algorithm, for example, a BP algorithm, an MP algorithm, an OMP algorithm, an ROMP algorithm, a CoSaMP algorithm, and an SP algorithm, the formula (8) to obtain Z. It may be known from $$Z = \begin{bmatrix} X_S \\ G_I \end{bmatrix}$$

that, Z includes an optimal solution of the user signal $X_S$ and an optimal solution of the interference signal $G_I$, and the optimal solution $G_I^0$ of the interference signal $G_I$ may be obtained by separating an optimal solution of Z, so that it may be determined that $G_I^0$ is the initial value of the interference signal $G_I$. After the initial value $G_I^0$ of the interference signal $G_I$ is determined, the initial value $G_I^0$ of the interference signal $G_I$ is set to a fixed known value, to calculate the optimal solution of the user signal $X_S$. The initial value $G_I^0$ of the interference signal $G_I$ is substituted into the foregoing formula (5), so as to obtain $y=\Phi_S X_S + \Phi_I G_I^0$, and further obtain $\Phi_S X_S = y - \Phi_I G_I^0$. Let $y_S = y - \Phi_I G_I^0$, and the formula (10) may be obtained. A compressive sensing theory is used to transform a process of solving the formula (10) into solving the foregoing formula (9) to obtain an optimal solution. The base station solves, by using the existing compressive sensing signal recovery algorithm, the formula (9) to obtain $Z_S$, where $Z_S$ is an optimal solution $X_S^1$ of the user signal $X_S$.

S303: The base station solves, by using the compressive sensing signal recovery algorithm, a formula (16) to obtain $Z_I$, where $Z_I$ is an optimal solution $G_I^1$ of the interference signal $G_I$:

$$\min_{z_I} \|\Phi_I Z_I - y_I\|_2, \ \text{s.t.} \|Z_I\|_0 = I \quad (16)$$

where $\Phi_I=E$ or $\Phi_I=H_I f_I$, where E is a unit vector, $H_I$ is a frequency-domain response of a channel passed through by the interference signal, and $f_I$ is a precoding vector used by interference user equipment UE; $y_I=y-\Phi_S X_S^1$; and I is a quantity of nonzero elements included in the interference signal.

For details, refer to step S203 in Embodiment 1, and details are not described herein again.

S304: The base station updates the quantity n of cycles to 1, and solves, by using the compressive sensing signal recovery algorithm, the formula (15) to obtain $Z_S$, where $Z_S$ is an optimal solution $X_S^2$ of the user signal $X_S$, where $y_S=y-\Phi_I G_I^1$.

S305: The base station solves, by using the compressive sensing signal recovery algorithm, the formula (16) to obtain $Z_I$, where $Z_I$ is an optimal solution $G_I^2$ of the interference signal $G_I$, where $y_I=y-\Phi_S X_S^2$.

S306: If n is less than or equal to a preset threshold m, the base station repeats an iteration process of steps S304 and S305, until the quantity n of cycles is greater than the preset threshold m, where an optimal solution $X_S^m$ of a sent signal $X_S$ obtained through an $m^{th}$ calculation is an estimated value of the user signal $X_S$, and an optimal solution $G_I^m$ of the interference signal $G_I$ obtained through the $m^{th}$ calculation is an estimated value of the interference signal $G_I$.

In this embodiment, by using respective sparse characteristics of a user signal and an interference signal, the user signal and the interference signal are iteratively recovered by using a compressive sensing signal recovery algorithm, that is, the interference signal is first fastened, and the user signal is recovered by using the compressive sensing signal recovery algorithm; and then the user signal is fastened, and the interference signal is recovered by using the compressive sensing signal recovery algorithm. In this way, an iteration cycle is repeated until the recovered user signal and the recovered interference signal meet a quantity of cycles, thereby effectively improving interference cancellation performance, achieving relatively good interference suppression.

Embodiment 3

Figure 7:
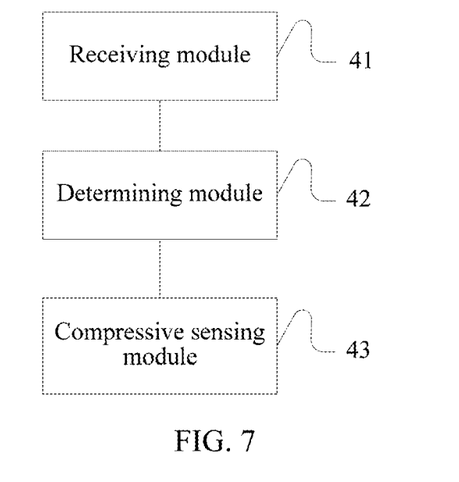
FIG. 7 is a schematic structural diagram of an embodiment of a base station according to the present invention.

FIG. 7 is a schematic structural diagram of an embodiment of a base station according to the present invention, and the base station specifically includes:

a receiving module 41, configured to receive a signal y, where the signal y includes a user signal $X_S$ and an interference signal $G_I$, where: $X_S$ is a vector including S user signals, and $X_S=[x_1\ x_2\ x_3\ \ldots\ x_s]$, where $x_1$ represents a first user signal, $x_2$ represents a second user signal, $x_3$ represents a third user signal, and so on, and $x_s$ represents an $s^{th}$ user signal; and $G_I$ is a vector including I interference signals, and $G_I=[g_1\ g_2\ g_3\ \ldots\ g_I]$, where $g_1$ represents a first interference signal, $g_2$ represents a second interference signal, $g_3$ represents a third interference signal, and so on, and $g_I$ represents an interference signal; and a determining module 42, configured to determine an initial value $G_I^0$ of the interference signal $G_I$, where $G_I^0=[g_1^0\ g_2^0\ g_3^0\ \ldots\ g_I^0]$; determine a value $X_S^1$ of the user signal $X_S$ according to the initial value $G_I^0$ and the signal y, where $X_S^1=[x_1^1\ x_2^1\ x_3^1\ \ldots\ x_s^1]$; determine that the value $X_S^1$ is an initial value $X_S^0$ of the user signal $X_S$, where $X_S^0=[x_1^1\ x_2^1\ x_3^1\ \ldots\ x_s^1]$; determine a value $G_I^1$ of the interference signal $G_I$ according to the initial value $X_S^0$ and the signal y, where $G_I^1=[g_1^1\ g_2^1\ g_3^1\ \ldots\ g_I^1]$; determine that the value $G_I^1$ is the initial value $G_I^0$ of the interference signal $G_I$, where $G_I^0=[g_1^1\ g_2^1\ g_3^1\ \ldots\ g_I^1]$; and perform iterative processing on the value $X_S^1$ of the user signal $X_S$ and the value $G_I^1$ of the interference signal $G_I$, until the value $X_S^1$ of the user signal $X_S$ and the value $G_I^1$ of the interference signal $G_I$ that are obtained through an $m^{th}$ iteration meet a preset condition, determine that an approximate value of the user signal $X_S$ is $X_S^1$, and determine that an approximate value of the interference signal $G_I$ is $G_I^1$.

Further, the determining module 42 is specifically configured to:

solve a formula (1) to obtain Z, where Z includes an optimal solution $G_I^{opt}$ of the interference signal $G_I$:

$$\min_{Z}\|\Phi Z - y\|_2,\ \text{s.t.}\|Z\|_0 = S + I \quad (1)$$

where $\|\ \|_2$ denotes the $l_2$-norm; $\|\ \|_0$ denotes the $l_0$-norm; $\Phi=[\Phi_S\ \Phi_I]$, and $$Z = \begin{bmatrix} X_S \\ G_I \end{bmatrix};$$

$\Phi_S=H_s$ or $\Phi_S=H_s f_S$, where $H_s$ is a frequency-domain response of a channel passed through by the user signal, and $f_s$ is a precoding vector used by user equipment UE; and $\Phi_I=E_I$ or $\Phi_I=H_I f_I$, where $E_I$ is a unit vector, $H_I$ is a frequency-domain response of a channel passed through by the interference signal, and $f_I$ is a precoding vector used by interference user equipment UE; and determine that the optimal solution $G_I^{opt}$ is the initial value $G_I^0$ of the interference signal $G_I$.

Further, the determining module 42 is specifically configured to:

solve a formula (2) to obtain an optimal solution $Z_S$, and determine that $Z_S$ is the value $X_S^1$ of the user signal $X_S$:

$$\min_{z_S}\|\Phi_S Z_S - y_S\|_2,\ \text{s.t.}\|Z_S\|_0 = S \quad (2)$$

where $y_S=y-\Phi_I G_I^0$; and solve a formula (3) to obtain an optimal solution $Z_I$, and determine that $Z_I$ is the value $G_I^1$ of the interference signal $G_I$:

$$\min_{z_I}\|\Phi_I Z_I - y_I\|_2,\ \text{s.t.}\|Z_I\|_0 = I \quad (3)$$

where $y_I=y-\Phi_S X_S^0$.

Further, the base station further includes: a compressive sensing module 43, configured to solve, by using a compressive sensing signal recovery algorithm, a formula to obtain an optimal solution.

Further, the determining module 42 is specifically configured to:

perform iterative processing on the value $X_S^1$ of the user signal $X_S$ and the value $G_I^1$ of the interference signal $G_I$, until a difference between an estimated error $\varepsilon^{m-1}$ obtained through calculation of a formula (4) by using the value $X_S^1$ of the user signal $X_S$ and the value $G_I^1$ of the interference signal $G_I$ that are obtained through an $(m-1)^{th}$ iteration and an estimated error $\varepsilon^m$ obtained through calculation of the formula (4) by using the value $X_S^1$ of the user signal $X_S$ and the value $G_I^1$ of the interference signal $G_I$ that are obtained through the $m^{th}$ iteration is greater than a preset threshold $\varepsilon$:

$$\varepsilon^i=\|\Phi_S X_S^1+\Phi_I G_I^1-y\|_2 \quad (4)$$

where i is a natural number, and $\varepsilon^i$ represents an estimated error obtained through an $i^{th}$ iteration; or collect statistics on a quantity of iteration times, until the quantity of iteration times is greater than a preset threshold m.

The base station in this embodiment is configured to execute the solutions of the method embodiments in Embodiment 1, Embodiment 2, and Embodiment 3. The implementation principle and the technical effect of this embodiment are similar to those of the method embodiments, and are not described in detail herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal processing method, comprising:

receiving, by a base station, a signal y, wherein the signal y comprises a user signal $X_S$ and an interference signal $G_I$, wherein: $X_S$ is a vector comprising S user signals, and $X_S=[x_1\ x_2\ x_3\ \ldots\ x_s]$, wherein $x_1$ represents a first user signal, $x_2$ represents a second user signal, $x_3$ represents a third user signal, and so on up to $x_s$ representing an $s^{th}$ user signal; and $G_I$ is a vector comprising I interference signals, and $G_I=[g_1\ g_2\ g_3\ \ldots\ g_I]$, wherein $g_1$ represents a first interference signal, $g_2$ represents a second interference signal, $g_3$ represents a third interference signal, and so on, and $g_I$ represents an $I^{th}$ interference signal;

determining, by the base station, an initial value $G_I^0$ of the interference signal $G_I$, wherein $G_I^0=[g_1^0\ g_2^0\ g_3^0\ \ldots\ g_I^0]$;

determining, by the base station, a value $X_s^1$ of the user signal $X_S$ according to the initial value $G_I^0$ and the signal y, wherein $X_s^1=[x_s^1\ x_2^1\ x_3^1\ x_s^1]$;

determining, by the base station, that the value $X_s^1$ is an initial value $X_s^0$ of the user signal $X_S$, wherein $X_s^0=[x_1^1\ x_2^1\ x_3^1\ \ldots\ x_s^1]$;

determining, by the base station, a value $G_I^1$ of the interference signal $G_I^1$ according to the initial value $X_s^0$ and the signal y, wherein $G_I^1=[g_1^1\ g_2^1\ g_3^1\ \ldots\ g_I^1]$;

determining, by the base station, that the value $G_I^1$ is the initial value $G_I^0$ of the interference signal $G_I$, wherein $G_I^0=[g_1^1\ g_2^1\ g_3^1\ \ldots\ g_I^1\mathbf{9}]$; and performing, by the base station, iterative processing on the determined value $X_s^1$ of the user signal $X_S$ and the determined value $G_I^1$ of the interference signal $G_I$, until the value $X_S^1$ of the user signal $X_S$ and the value $G_I^1$ of the interference signal $G_I$ that are obtained through an $m^{th}$ iteration meet a preset condition;

determining, by the base station, that an approximate value of the user signal $X_S$ is $X_s^1$; and determining, by the base station, that an approximate value of the interference signal $G_I$ is $G_I^1$.

2. The method according to claim 1, wherein the determining, by the base station, the initial value $G_I^0$ of the interference signal $G_I$ comprises:

solving, by the base station, a formula (1) to obtain Z, wherein Z comprises an optimal solution $G_I^{opt}$ of the interference signal $G_I$:

$$\min_{Z}\|\Phi Z - y\|_2,\ \text{s.t.}\|Z\|_0 = S + I \tag{1}$$

wherein $\|\ \|_2$ denotes the $l_2$-norm; $\|\ \|_0$ denotes the $l_0$-norm; $\Phi=[\Phi_S\ \Phi hd\ I]$, and $$Z = \begin{bmatrix} X_S \\ G_I \end{bmatrix};$$

$\Phi_s=H$ or $\Phi_s=H_s f_s$, wherein $H_s$ is a frequency-domain response of a channel passed through by the user signal, and $f_s$ is a precoding vector used by user equipment (UE); and $\Phi_I=E_I$ or $\Phi_I=H_I f_I$, wherein $E_I$ is a unit vector, $H_I$ is a frequency-domain response of a channel passed through by the interference signal, and $f_I$ is a precoding vector used by interference UE; and determining, by the base station, that the optimal solution $G_I^{opt}$ is the initial value $G_I^0$ of the interference signal $G_I$.

3. The method according to claim 1, wherein the determining, by the base station, a value $X_s^1$ of the user signal $X_S$ according to the initial value $G_I^0$ and the signal y comprises:

solving, by the base station, a formula (2) to obtain an optimal solution $Z_s$, and determining that $Z_s$ is the value $X_s^1$ of the user signal $X_s$:

$$\min_{Z_S}\|\Phi_S Z_S - y_S\|_2,\ \text{s.t.}\|Z_S\|_0 = S \tag{2}$$

wherein $y_s=y-\Phi_I G_I^0$; and correspondingly, the determining, by the base station, the value $G_I^1$ of the interference signal $G_I$ according to the initial value $X_s^0$ and the signal y comprises:

solving, by the base station, a formula (3) to obtain an optimal solution $Z_I$, and determining that $Z_I$ is the value $G_I^1$ of the interference signal $G_I$:

$$\min_{Z_I}\|\Phi_I Z_I - y_I\|_2,\ \text{s.t.}\|Z_I\|_0 = I \tag{3}$$

wherein $y_I=y-\Phi_S X_s^0$.

4. The method according to claim 2, wherein the base station solves a formula by using a compressive sensing signal recovery algorithm to obtain an optimal solution.

5. The method according to claim 1, wherein the performing, by the base station, iterative processing on the determined value $X_s^1$ of the user signal $X_S$ and the determined value $G_I^1$ of the interference signal $G_I$, until the value $X_s^1$ of the user signal $X_S$ and the value $G_I^1$ of the interference signal $G_I$ that are obtained through the $m^{th}$ iteration meet the preset condition comprises:

performing, by the base station, iterative processing on the determined value $X_s^1$ of the user signal $X_S$ and the determined value $G_I^1$ of the interference signal $G_I$, until a difference between an estimated error $\varepsilon^{m-1}$ obtained rough calculation of a formula (4) by using the value $X_s^1$ of the user signal $X_S$ and the value $G_I^1$ of the interference signal $G_I$ that are obtained through an $(m-1)^{th}$ iteration and an estimated error $\varepsilon^m$ obtained through calculation of the formula (4) by using the value $X_s^1$ of the user signal $X_S$ and the value $G_I^1$ of the interference signal $G_I$ that are obtained through the $m^{th}$ iteration is greater than a preset threshold $\varepsilon$:

$$\varepsilon^i=\|\Phi_S X_s^1+\Phi_I G_I^1-y\|_2 \tag{4}$$

wherein i is a natural number, and $\varepsilon^i$ represents an estimated error obtained through an $i^{th}$ iteration;

or collecting, by the base station, statistics on a quantity of iteration times, until the quantity of iteration times is greater than a preset threshold m.

6. A base station, comprising:

a receiver; and a processor;

wherein the receiver is configured to:

receive a signal y, wherein the signal y comprises a user signal $X_S$ and an interference signal $G_I$, wherein: $X_S$ is a vector comprising S user signals, and $X_S=[x_1\ x_2\ x_3\ \ldots\ x_S]$, wherein $x1$ represents a first user signal, $x_2$ represents a second user signal, $x_3$ represents a third user signal, and so on up to $x_s$ representing an $s^{th}$ user signal; and $G_I$ is a vector comprising I interference signals, and $G_I=[g_1\ g_2\ g_3\ \ldots\ g_I]$, wherein $g1$ represents a first interference signal, $g_2$ represents a second interference signal, $g_3$ represents a third interference signal, and so on, and $g_I$ represents an $I^{th}$ interference signal;

wherein the processor is configured to:

determine an initial value $G_I^0$ of the interference signal $G_I$, wherein $G_I^0=[g_1^0\ g_2^0\ g_3^0\ \ldots\ g_I^0]$;

determine a value $X_s^1$ of the user signal $X_S$ according to the initial value $G_I^0$ and the signal y, wherein $X_s^1=[x_1^1\ x_2^1\ x_3^1\ \ldots\ X_s^1]$;

determine that the value $X_s^1$ is an initial value $X_s^0$ of the user signal $X_S$, wherein $X_s^0=[x_1^1\ x_2^1\ x_3^1\ \ldots\ x_s^1]$;

determine a value $G_I^1$ of the interference signal $G_I$ according to the initial value $X_s^0$ and the signal y, wherein $G_I^1 = [g_1^1\ g_2^1\ g_3^1\ \ldots\ g_I^1]$;

determine that the value is the initial value $G_I^1$ is the initial value $G_I^0$ of the interference signal $G_I$, wherein $G_I^0 = [g_1^1\ g_2^1\ g_3^1\ \ldots\ g_I^1]$; and perform iterative processing on the value $X_s^1$ of the user signal $X_S$ and the value $G_I^1$ of the interference signal $G_I$, until the value $X_s^1$ of the user signal $X_S$ and the value $G_I^1$ of the interference signal $G_I$ that are obtained through an $m^{th}$ iteration meet a preset condition;

determine that an approximate value of the user signal $X_S$ is $X_s^1$; and determine that an approximate value of the interference signal $G_I$ is $G_I^1$.

7. The base station according to claim 6, wherein the processor is further configured to:

solve a formula (1) to obtain Z, wherein Z comprises an optimal solution $G_1^{opt}$ of the interference signal $G_I$:

$$\min_{z} \|\Phi Z - y\|_2, \text{ s.t.} \|Z\|_0 = S + I \tag{1}$$

wherein $\|\ \|_2$ denotes the $l_2$-norm; $\|\ \|_0$ denotes the $l_0$-norm; $\Phi = [\Phi_S\ \Phi_I]$, and $$Z = \begin{bmatrix} X_S \\ G_I \end{bmatrix};$$

$\Phi_s = H$ or $\Phi_s = H_s f_s$, wherein $H_s$ is a frequency-domain response of a channel passed through by the user signal, and $f_s$ is a precoding vector used by user equipment UE; and $\Phi_I = E_I$ or $\Phi_I = H_I f_I$, wherein $E_I$ is a unit vector, $H_I$ is a frequency-domain response of a channel passed through by the interference signal, and $f_I$ is a precoding vector used by interference user equipment UE; and determine that the optimal solution $G_I^{opt}$ is the initial value $G_I^0$ of the interference signal $G_I$.

8. The base station according to claim 6, wherein the processor is further configured to:

solve a formula (2) to obtain an optimal solution $Z_s$, and determine that $Z_s$ is the value $X_s^1$ of the user signal $X_S$:

$$\min_{z_S} \|\Phi_S Z_S - y_S\|_2, \text{ s.t.} \|Z_S\|_0 = S \tag{2}$$

wherein $y_s = y - \Phi_I G_I^0$; and solve a formula (3) to obtain an optimal solution $Z_I$, and determine that $Z_I$ is the value $G_I^1$ of the interference signal $G_I$:

$$\min_{z_I} \|\Phi_I Z_I - y_I\|_2, \text{ s.t.} \|Z_I\|_0 = I \tag{3}$$

wherein $y_I = y - \Phi_S X_s^0$.

9. The base station according to claim 7, wherein the processor is further configured to solve, by using a compressive sensing signal recovery algorithm, a formula to obtain an optimal solution.

10. The base station according to claim 6, wherein the processor is further configured to:

perform iterative processing on the value $X_s^1$ of the user signal $X_S$ and the value $G_I^1$ of the interference signal $G_I$, until a difference between an estimated error $\varepsilon^{m-1}$ obtained through calculation of a formula (4) by using the value $X_s^1$ of the user signal $X_s$ and the value $G_I^1$ of the interference signal $G_I$ that are obtained through an $(m-1)^{th}$ iteration and an estimated error $\varepsilon^m$ obtained through calculation of the formula (4) by using the value $X_s^1$ of the user signal $X_S$ and the value $G_I^1$ of the interference signal $G_I$ that are obtained through the $m^{th}$ iteration is greater than a preset threshold $\varepsilon$:

$$\varepsilon^i = \|\Phi_S X_s^1 + \Phi_I G_I^1 - y\|_2 \tag{4}$$

wherein i is a natural number, and $\varepsilon^i$ represents an estimated error obtained through an $i^{th}$ iteration; or collect statistics on a quantity of iteration times, until the quantity of iteration times is greater than a preset threshold m.

* * * * *